June 19, 1956 A. P. KING 2,750,912
APPARATUS FOR JOINING LENGTHS OF WAVE GUIDE OR THE LIKE
Filed Sept. 11, 1951
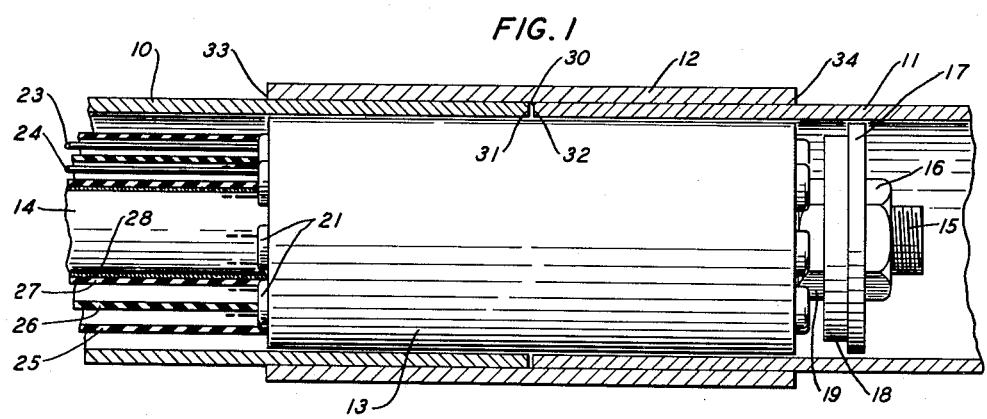
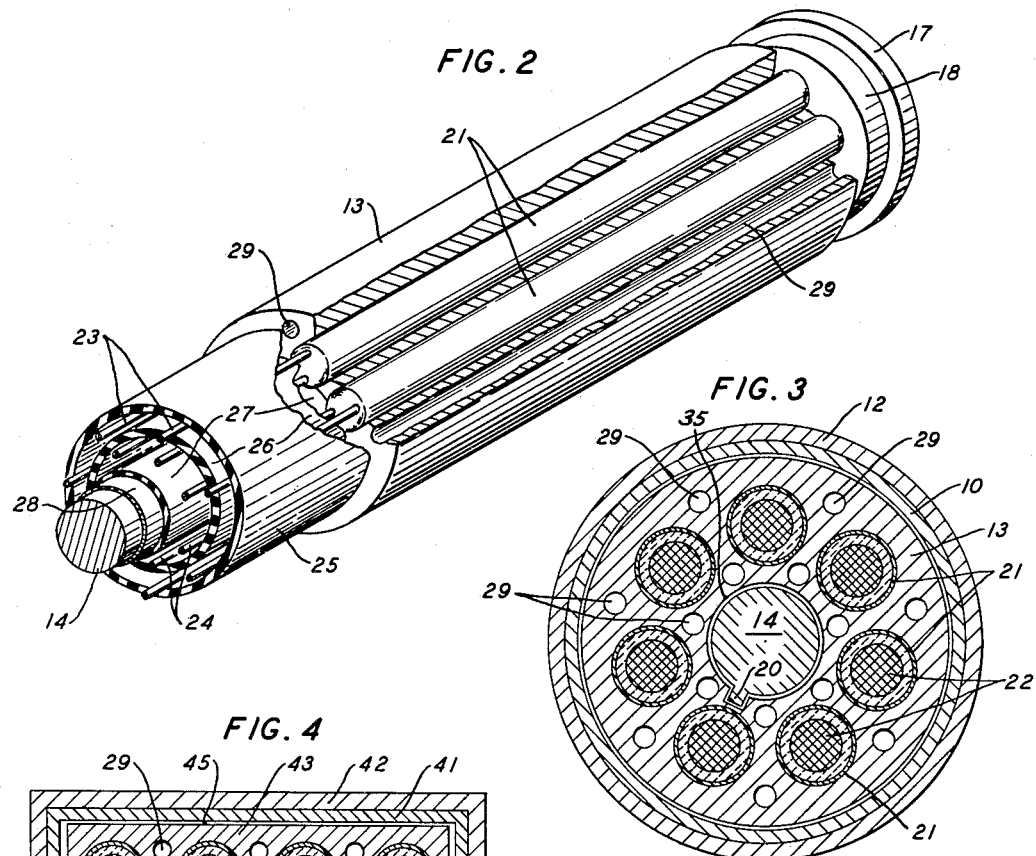
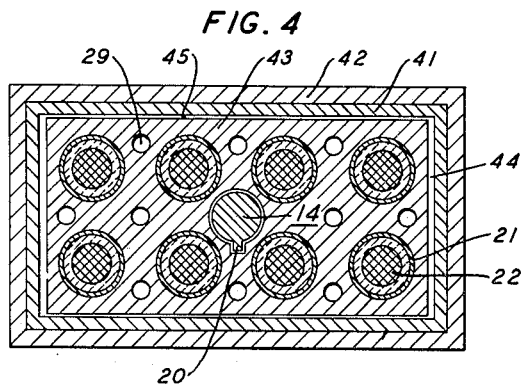
INVENTOR
*A. P. KING*
BY
*H. O. Wright*
ATTORNEY `United States Patent Office`

2,750,912
Patented June 19, 1956

2,750,912

APPARATUS FOR JOINING LENGTHS OF WAVE GUIDE OR THE LIKE

Archie P. King, Red Bank, N. J., assignor to Bell Telephone Laboratories, Incorporated, New York, N. Y., a corporation of New York Application September 11, 1951, Serial No. 246,068

6 Claims. (Cl. 113—111)

This invention relates to the art of joining sections of wave transmission line such as wave guides and, more particularly, to new apparatus for aligning, coupling, and joining sections of such lines.

It is well known that careful consideration must be given to the problem of coupling successive sections of shielded transmission line, such as wave guides, in order to avoid the small impedance discontinuities which produce undesirable reflections of the transmitted energy at the points of coupling. According to present practice, each section of wave guide is usually manufactured with an integrally connected flange member at each of its ends for connection to a similar flange member of a succeeding section. In order to prevent leakage of wave energy through the resulting joint, special wave-guide devices such as slots or grooves one-quarter wavelength deep were often carefully machined into each flange member. Both the flanges and the machining add considerably to the cost of wave-guide apparatus.

An object of the present invention is to economically reduce impedance discontinuities at the joints of connected sections of wave-guide transmission line.

Another object of the invention is to precisely align the inner surfaces of the two lengths of wave guide to be connected.

A further object of the invention is to join two sections of wave guide to produce a long length of semipermanent transmission line which is free from impedance irregularities and to make the electrical performance of the line approach that of the single piece of wave-guide transmission line.

These and other objects of the present invention are accomplished in the specific embodiments to be hereinafter described by soldering the abutting ends of the successive wave-guide sections to be joined in the particular manner to be shown with the particular apparatus to be described. In general, a juncture insert made of material having a higher coefficient of expansion than the material of the wave guides is formed and shaped to fit with small clearance within the guides. This juncture insert is placed within an end portion of each of two guides to be joined. The insert and the end portions are then heated so that the insert expands and fits tightly against the inner surfaces of the guides. Solder is placed upon the outside of the guides which flows to the point of greatest heat between the abutting edges of the end portions. The insert is then cooled so that it contracts and may be removed from within the joined length of wave guide.

In a particular embodiment of the invention, the insert and the end portions are heated by means located within the insert. In this embodiment, the juncture insert thus simultaneously serves three distinct functions. It serves as a source of heat; it precisely aligns the inside surfaces of the guides; and it serves as a form or mold against which the added solder cools to form a smooth discontinuity-free fill between the abutting edges of the guides.

A special feature of the invention involves a protecting and strengthening sleeve placed around the end portions of the guides before making the connection. Another feature resides in the means for cooling the joint.

These and other objects, the nature of the present invention, its various other features and advantages will appear more fully upon consideration of the various illustrative embodiments shown in the accompanying drawings and in the following detailed description of these embodiments.

In the drawings:

Fig. 1 shows a sectional view of the related wave guides to be joined and a juncture insert, in accordance with the invention, properly located within the guides;

Fig. 2 shows a cut-away perspective view of the juncture insert Fig. 1;

Fig. 3 is the typical cross-sectional view of the related wave guides and the juncture insert of Fig. 1, taken at some point through the center of the juncture insert; and Fig. 4 is a cross-sectional view of a modification of the related guides and juncture insert of Fig. 1 in which the wave guides and the insert are of rectangular cross-section, the section being taken along a line corresponding to the position of Fig. 3.

In more detail, Fig. 1 shows an end portion of a first wave guide 10, assumed at present to be of circular cross-section as shown in Fig. 3, to be joined to an end portion of an identical wave guide 11. Around the end portions in the region of gap 30 left between the abutting edges 31 and 32 of guides 10 and 11, respectively, is placed a cylindrical sleeve 12 having an inside diameter substantially equal to the outside diameter of guides 10 and 11.

Located within guides 10 and 11 in the region of the connection to be made between edges 31 and 32 is shown a juncture insert in accordance with the invention. Considering Figs. 1, 2 and 3 together, this insert is seen to comprise a cylinder 13 having a normal outside diameter slightly less than the normal inside diameter of guides 10 and 11. Cylinder 13 is made of material having a somewhat higher coefficient of expansion in the presence of heat than the material of which guides 10 and 11 are made. As a specific embodiment, it is contemplated that guides 10 and 11 are made of either copper or brass, and in such a case, an alloy of aluminum is ideally suited as the material of cylinder 13. In order to insert cylinder 13 within guides 10 and 11, to align it longitudinally at gap 30, and to withdraw it from the guides when the joint is completed, cylinder 13 is loosely mounted upon a piston rod 14, which extends through a longitudinal hole 35 of diameter slightly larger than that of rod 14 in the center of cylinder 13, and is compliantly held in association with rod 14 by a keying mechanism 20. The right-hand end, as shown, of rod 14 is provided with threads 15. Located adjacent cylinder 13 on rod 14 is a nut 19 engaging threads 15, followed by a disc 18 of heat insulating material such as transite, followed by a steel plate 17 which protects heat shield 18 from possible breakage, followed by a second nut 16 engaging threads 15. At the other end of rod 14 may be located an adjustable stop (not shown) to permit a semipermanent adjustment of the distance at which cylinder 13 may be inserted within guide 10 for use in successive joining operations of wave-guide sections having similar lengths.

In the course of practicing the invention according to the method to be described in detail hereinafter, it is necessary to raise the temperature of the end portions of guides 10 and 11, of sleeve 12, and cylinder 13 to a sufficient soldering temperature. In accordance with one alternative mode of operation this heat may be supplied from an external source, such as a blowtorch, the heat being applied to sleeve 12. However, a more refined embodiment of the invention is illustrated in the drawings whereby the heat is supplied internally of cylinder 13 by means of cylindrical heating elements 21 distributed in some suitable configuration throughout the volume of cylinder 13 and located in longitudinal holes drilled through cylinder 13. Heating elements 21 may be cartridge-type electric heaters of the type commonly found in electrical appliances, such as soldering irons, having a winding 22 of high resistance conductor embedded in a ceramic form. The electrical conducting leads 23 and 24 from elements 21 may be insulated by some heat resistant material, such as asbestos fiber, or they may be brought out uninsulated through concentric insulating and protecting members. As may be seen on Figs. 1 or 2, these members comprise a first cylindrical layer of heat insulating material 28 such as asbestos immediately surrounding rod 14, followed by a second cylindrical layer of electrical insulating material 27 such as Bakelite, followed by third and fourth cylindrical layers of insulating material 26 and 25, respectively, such as Bakelite. Conducting leads 23 are brought out between cylinders 25 and 26 while the conducting leads 24 are brought out between the cylinders 26 and 27. Leads 23 are connected together to one side of an electrical power source while leads 24 are connected to the other side.

In accordance with a preferred mode of practicing the invention, the end portions of guides 10 and 11 and the internal surface of sleeve 12 are thoroughly cleaned and suitably covered with a fluxing material preparatory to the soldering operation. The juncture insert is positioned as has been described. This assembly is suitably heated by the means described. Upon heating, guides 10 and 11 and sleeve 12 will expand, but since cylinder 13 has a higher coefficient of expansion than the guides and the sleeve, cylinder 13 expands a greater amount so that at soldering temperature it fits tightly against the inside walls of guides 10 and 11 and precisely aligns these walls in the region of gap 30. When soldering temperature is reached, solder is applied around the edges of shield 12, for example, at points such as 33 and 34. Because solder flows in the direction of increasing temperature gradient, the applied solder will flow from points 33 and 34 into the center region under sleeve 12 and will completely fill gap 30. Due to the extremely close fit between insert 13 and the inside surface of guides 10 and 11, the solder is retained by the surface of insert 13, serving as a form or mold, entirely within gap 30 to form a smooth discontinuity-free fill between the abutting edges 31 and 32 of the end portions.

After the soldering operation, during which sleeve 12 has become firmly fastened to the outside surfaces of guides 10 and 11, it adds great rigidity and strength to the connected area thus preventing cracking and distorting of the soldered joint. After the above-described soldering operation has been completed the entire assembly is allowed to cool until cylinder 13 shrinks away from the inside walls of guides 10 and 11 sufficiently to allow it to be easily withdrawn by rod 14 from within guides 10 and 11, leaving a smooth discontinuity-free solder fill between the abutting edges 31 and 32.

In order to expedite the cooling operation, a plurality of longitudinal holes 29 are drilled through cylinder 13 and distributed therein among the heating elements 21. Through these ventilating holes 29 compressed air, or preferably carbon dioxide, is forced which greatly speeds up the cooling and the accompanying contraction of cylinder 13.

It should be noted that the above-described relative expansion of cylinder 13 within the guides is a differential function depending upon relative coefficients of expansion of the material of the guides and the material of the cylinder 13. In a typical embodiment in which the guides 10 and 11 are made of copper and have a cold inside diameter of substantially 2.8 inches, the cold outside diameter of cylinder 13, which may then be made of the alloy Duralumin, should be approximately .009 to .010 inch smaller than the inside diameter of the guides.

In order to avoid scratching or marring the outside surface of cylinder 13 by the repeated insertion and withdrawal of the cylinder within the interior of numerous wave guides, the outside surface of cylinder 13 may be coated with a hard surface, for example, by electroplating it with a hard metal such as chromium. On the other hand, if cylinder 13 is composed of aluminum as suggested above, this surface may be hardened by chemical treatment to form a durable coating of aluminum oxide.

The cross-sectional view of Fig. 4 illustrates an adaptation of the invention suitable for use in connecting or joining wave guides of rectangular cross-section. Thus, in Fig. 4, 41 represents such a rectangular wave guide, 42 represents a rectangular sleeve member placed therearound, and 43 represents a juncture insert which, except for its cross-sectional dimensions, is identical to the insert of Figs. 2 and 3 and, therefore, corresponding reference numerals have been employed. It should be noted that since the expansion of the insert material in a given direction is a linear expansion, proportional to the length of the material in that direction, more clearance space 44 should be provided between the narrow dimension surfaces of the cross-section than the clearance space 45 between the wide dimension surfaces of the cross-section. Thus, when the insert is heated, it will make forceful contact with both the narrow and wide surfaces of the rectangular wave guides to be joined.

In all cases, it is understood that the above-described arrangements are simple illustrations of a small number of the many possible specific embodiments which can represent applications of the principles of the invention. Numerous and varied other arrangements can readily be devised in accordance with these principles by those skilled in the art without departing from the spirit and the scope of the invention.

What is claimed is:

1. A device for joining sections of pipe comprising, in combination, a metal body having a transverse cross-sectional dimension slightly less than the inside transverse cross-sectional dimension of the pipes to be joined, said metal body having a thermal coefficient of expansion greater than that of the pipes to be joined, said body having a centrally located bore extended longitudinally therethrough and having a plurality of spaced heater holes extending longitudinally therethrough and displaced from said centrally located bore, said body further having a plurality of cooling holes spaced from said heater holes and displaced from said bore, heater elements inserted in said heater holes for heating said body and the pipes to be joined and means for inserting said body into and removing said body from inside the pipes to be joined.

2. A device for joining sections of pipe comprising in combination, a cylindrical metal body having a diameter slightly less than the inside diameter of the pipes to be joined, said metal body having a thermal coefficient of expansion greater than that of the pipes to be joined, said body having a centrally located bore extending longitudinally therethrough, and having a plurality of circumferentially spaced heater holes extending longitudinally therethrough and radially displaced from said centrally located bore, said body further having a plurality of cooling holes circumferentially spaced from said heater holes and radially displaced from said bore, heater elements insertable in said heater holes for heating said body and the pipes to be joined, and means for inserting said body into and removing said body from inside the pipes to be joined.

3. Apparatus for making a discontinuity-free joint between two lengths of electromagnetic wave guide having transverse cross-sectional dimensions and for joining said lengths of wave guide to a hollow sleeve having an inner transverse cross-sectional dimension substantially equal to the outer transverse cross-sectional dimension of the lengths of wave guide, comprising, in combination, an insert means having transverse cross-sectional dimensions slightly less than the wave guide dimensions, said insert being made of a material having a higher thermal coefficient of expansion than the material comprising the wave guide, a plurality of cylindrical heating elements distributed throughout the volume of said insert for raising the temperature of both said insert and the wave guide members, said elements being dispersed in longitudinal holes extending through said insert, said insert having a further plurality of longitudinal holes distributed among said heating elements for ventilating said insert, and means for inserting and withdrawing said insert from within the interior of the wave guide.

4. Apparatus for joining lengths of electromagnetic wave guide having transverse cross-sectional dimensions to a hollow sleeve having an inner transverse cross-sectional dimension substantially equal to the outer transverse cross-sectional dimension of the lengths of wave guide, including an insert means having transverse cross-sectional dimensions slightly less than the said wave guide dimension, said insert means being made of material having a higher thermal coefficient of expansion than the material comprising said wave guide, heating means distributed within the volume of said insert for raising the temperature of said insert and said wave guide, and means for inserting and withdrawing said insert from within the interior of said wave guide.

5. Apparatus for making a discontinuity-free joint between two lengths of electromagnetic wave guide having a circular transverse cross-section, and joining said lengths of wave guide to a hollow sleeve having an inside diameter substantially equal to the outside diameter of the wave guide, including an insert means of circular transverse cross-section having a radial dimension slightly less than the inner radial dimensions of said wave guide cross-section, said insert being made of material having a higher thermal coefficient of expansion than the material comprising said wave guide, a plurality of electrical heating elements distributed within said insert, and means for inserting and withdrawing said insert from within the interior of said wave guide.

6. Apparatus for making a discontinuity-free joint between two lengths of electromagnetic wave guide having a rectangular transverse cross-section, and joining said lengths of wave guide to a hollow sleeve having an inner transverse cross-sectional dimension substantially equal to the outer transverse cross-sectional dimension of the lengths of wave guide, including insert means having a rectangular transverse cross-section, the smaller dimension of said insert cross-section being a small percentage less than the corresponding inner dimension of said wave guide cross-section, the larger dimension of said insert cross-section being the same small percentage less than the corresponding inner dimension of said wave guide cross-section, said insert being made of a material having a higher coefficient of expansion than the material comprising said wave guide, heating means distributed within the volume of said insert for raising the temperature of said insert and means for inserting and withdrawing said insert from within the interior of said wave guide.

References Cited in the file of this patent

UNITED STATES PATENTS

| Number | Name | Date |
|---|---|---|
| 407,778 | Henderson | July 30, 1889 |
| 1,435,919 | Fay | Nov. 21, 1922 |
| 1,706,393 | Fay | Mar. 26, 1929 |
| 1,870,475 | Arnold | Aug. 9, 1932 |
| 1,964,926 | Moss | July 3, 1934 |
| 2,004,787 | Gillette | June 11, 1935 |
| 2,078,546 | Sebell | Apr. 27, 1937 |
| 2,173,109 | Hamblin | Sept. 19, 1939 |
| 2,176,602 | Beck et al. | Oct. 17, 1939 |
| 2,331,689 | Hodge | Oct. 12, 1943 |
| 2,399,646 | Linden | May 7, 1946 |
| 2,412,271 | Kercher | Dec. 10, 1946 |
| 2,424,878 | Crook | July 29, 1947 |
| 2,433,296 | Schaefer | Dec. 23, 1947 |
| 2,480,598 | Ost | Aug. 30, 1949 |
| 2,503,431 | Bender et al. | Apr. 11, 1950 |